United States Patent [19]

DiMarco et al.

[11] Patent Number: 4,867,525
[45] Date of Patent: Sep. 19, 1989

[54] OPTICAL CONNECTOR

[75] Inventors: Brian A. DiMarco, Taylorsville; Johnny W. Beatty, Maiden, both of N.C.

[73] Assignee: Siecor Corporation, Hickory, N.C.

[21] Appl. No.: 226,033

[22] Filed: Jul. 29, 1988

[51] Int. Cl.⁴ .............................................. G02B 6/36
[52] U.S. Cl. ................................................ 350/96.20
[58] Field of Search ................ 350/96.20, 96.21, 96.22

[56] References Cited

U.S. PATENT DOCUMENTS

| | | | |
|---|---|---|---|
| 4,101,197 | 7/1978 | Kent et al. | 350/96.17 |
| 4,185,883 | 1/1980 | Chown et al. | 350/96.20 |
| 4,257,674 | 3/1981 | Griffin et al. | 350/96.21 |
| 4,261,642 | 4/1981 | Lewis et al. | 350/96.20 |
| 4,261,721 | 4/1981 | Lewis | 65/4 B |
| 4,261,774 | 6/1981 | Lewis et al. | 156/86 |
| 4,264,128 | 4/1981 | Young | 350/96.20 |
| 4,290,668 | 9/1981 | Ellis et al. | 350/96.20 |
| 4,303,304 | 11/1981 | Ruiz | 350/96.20 |
| 4,355,862 | 10/1982 | Kock | 350/96.2 |
| 4,362,356 | 12/1982 | Williams | 350/96.20 |
| 4,378,954 | 4/1983 | Baker | 350/320 |
| 4,440,471 | 4/1984 | Knowles | 350/96.20 |
| 4,458,983 | 10/1984 | Roberts | 350/96.20 |
| 4,487,474 | 12/1984 | Nishie et al. | 350/96.21 |
| 4,611,887 | 9/1986 | Glover et al. | 350/96.21 |
| 4,669,820 | 1/1987 | Ten Berge | 350/96.20 |
| 4,691,986 | 9/1987 | Aberson, Jr. et al. | 350/96.21 |

FOREIGN PATENT DOCUMENTS

| | | | |
|---|---|---|---|
| 104416 | 4/1984 | European Pat. Off. | |
| 2557472 | 6/1977 | Fed. Rep. of Germany | 350/96.20 |
| 54-161953 | 12/1979 | Japan | |
| 57-115512 | 7/1982 | Japan | |
| 60-57808 | 3/1985 | Japan | |
| 60-185909 | 9/1985 | Japan | |

*Primary Examiner*—William L. Sikes
*Assistant Examiner*—Akm E. Ullah
*Attorney, Agent, or Firm*—J. David Abernethy

[57] ABSTRACT

An optical connector having an optical fiber mounted in a sleeve, the hardness of the materials comprising the optical fiber being greater than the hardness of the materials comprising the sleeve. An optical connector as described above may be used for making an optical connector having a recessed sleeve, by abrading an end of the optical fiber and the sleeve.

8 Claims, 2 Drawing Sheets

OPTICAL CONNECTOR

BACKGROUND OF THE INVENTION

1. Field of the Invention

The field of the invention is fiber optic connectors and methods for making them.

2. Background of the Invention.

In a fiber optic communication system, it is necessary to couple lengths of cable to each other as well as to opto-electronic devices. Many prior art connectors feature a connector in which a sleeve holds an optical fiber, and the sleeve is recessed slightly from the end of the optical fiber. The invention disclosed herein discloses a connector which is particularly well adapted to being formed in this arrangement. Also disclosed is a method for making such a connector by use of a simple abrasion process.

SUMMARY OF THE INVENTION

It is an object of the invention to describe a method for making tips for optical connectors in a particularly simple fashion by use of a sleeve having a first end composed of a first set of one or more materials and an optical fiber mounted in the sleeve, the optical fiber composed of a second set of one or more materials, the hardness of all of the second set of materials being greater than the hardness of all of the first set of materials. The sleeve opening may be flared at the second end. In a preferred embodiment, the first end of the sleeve is made from borosilicate and is recessed slightly from an end of the optical fiber, and a ceramic ferrule circumscribes the sleeve and is recessed slightly from an end of the sleeve. The sleeve opening may be flared at the second end to facilitate insertion of the optical fiber.

A particularly useful method for making such a connector is to provide an optical fiber composed of a second set of one or more materials, placing a sleeve having a first end and a second end around the optical fiber, the first sleeve end composed of a first set of one or more materials the hardness of all of the second set of materials being greater than the hardness of all of the first set of materials; and abrading an end of the optical fiber and an end of the sleeve adjacent to the end of the optical fiber being abraded. Following such abrasions, it is found that the sleeve tends to be recessed slightly from the end of the optical fiber, due to the sleeve being made of a softer material than the optical fiber.

It will be seen that the proper selection of materials allows the desired recessing of the sleeve to be made by simply abrading an end of the optical fiber and sleeve circumscribing it. Therefore, precise techniques for locating the tips of the sleeve and optical fiber become unnecessary.

It is found to be desirable to have the end of the optical fiber protrude slightly from the end of the sleeve, to facilitate a good junction between the optical fiber and the optical fiber or opto-electronic device to which it is being connected.

BRIEF DESCRIPTION OF THE DRAWINGS

The specification will refer to the following drawings, in which.

DETAILED DESCRIPTION OF THE PREFERRED EMBODIMENT

Figure 1:
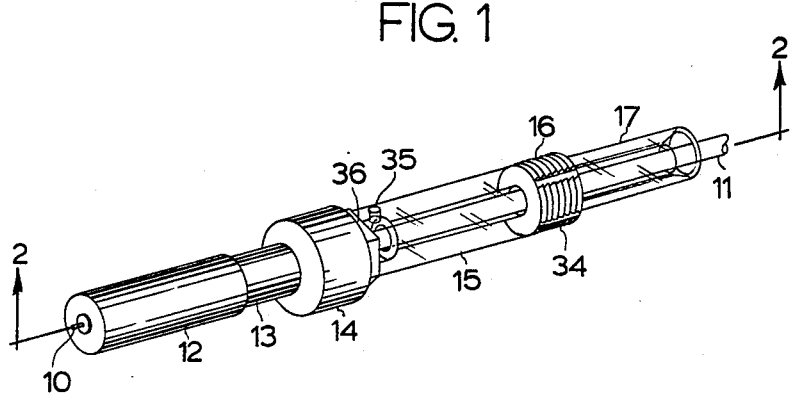
FIG. 1 is a perspective view of an optical fiber mounted in the sleeve, ferrule, and ferrule holder.
Figure 2:
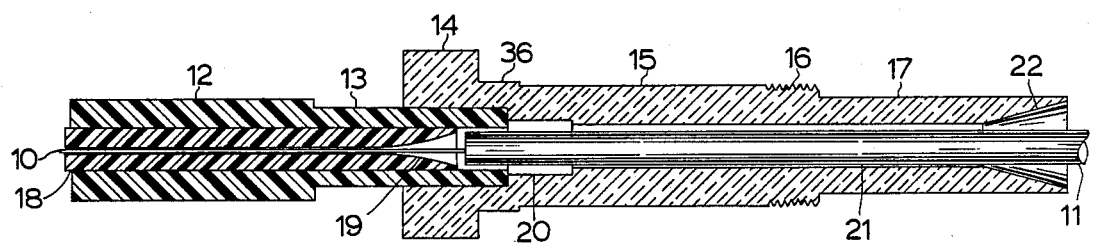
FIG. 2 is a sectional view along line 2—2 of FIG. 1.

Referring to FIGS. 1 and 2, optical fiber 10 is mounted within sleeve 18, which is, in turn, held by ceramic ferrule 12 circumscribing sleeve 18.

In the preferred embodiment, optical fiber 10 may be an optical fiber manufactured by Corning Glass Works bearing glass code No. 7940, having a Knoop hardness of 489; and sleeve 18 is a clear borosilicate manufactured by Corning Glass Works having glass code No. 7740, which has a Knoop hardness of 418. Therefore, optical fiber 10 has a hardness greater than that of sleeve 18.

Ceramic ferrule 12 has a recessed portion 13. Sleeve 18 has flared portion 19 on its second end, in order to allow for easy entry of optical fiber 10.

Ferrule 12 is held by a ferrule holder, whose outer diameter comprises shoulder 14, hex-shaped portion 36, middle portion 15, threaded portion 16, and end portion 17. Threaded portion 16 has v-grooves 34 to accommodate strands of aramid fibers from buffer tube 11. Its inner diameter is comprised of flared portion 22, bore 21 to accommodate buffer tube 11, chamber 20, which serves as a pocket to receive air and epoxy, and an end bore portion to receive ferrule 12.

Note small hole 35 is bored through the side of the ferrule holder, in order to allow excess epoxy to escape.

Figure 3:
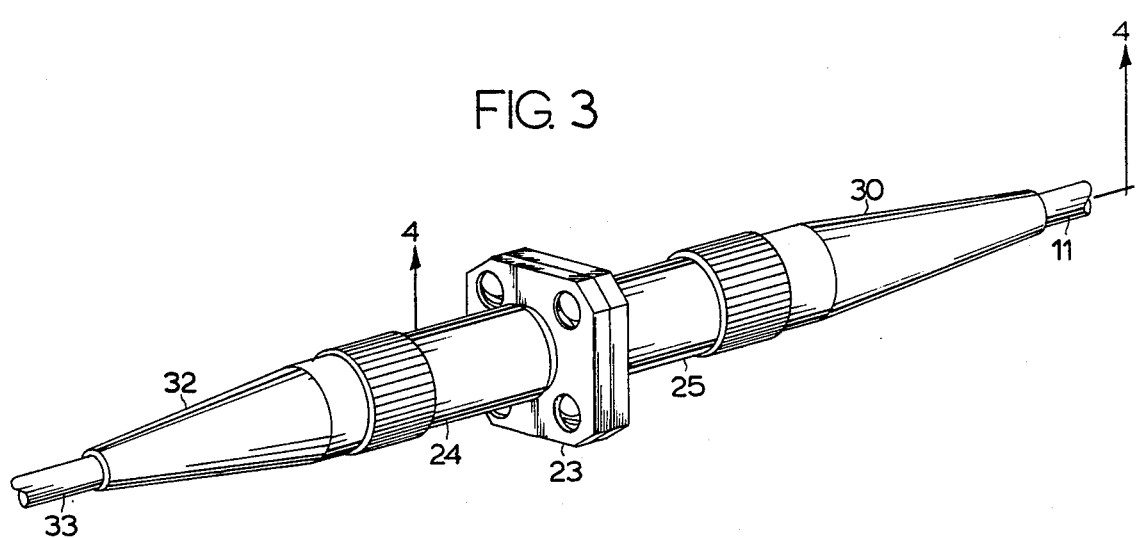
FIG. 3 is a perspective view of an assembly utilizing the connector to optically couple two optical fibers.
Figure 4:
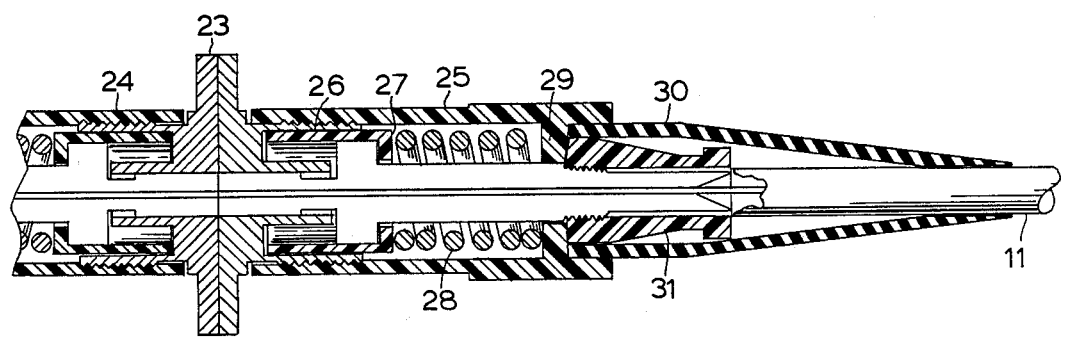
FIG. 4 is a sectional view along lines 4—4 of FIG. 3 with some elements of FIGS. 1-2 omitted for clarity.

FIGS. 3 and 4 show a preferred completed connector assembly. Attached to a standard connector 23 are plastic coupling nuts 24, 25. Rubber boots 30, 32 are inserted against coupling nuts 25, 24. Buffer tubes 11, 33 enter boots 30, 32. Coupling nut 25 has threaded inner portion 26 engaging connector 23. Anti-rotation ring 27 is placed inside coupling nut 25. Anti-rotation ring 27 also engages connector 23 to inhibit internal rotation of the device. Placed between the anti-rotation ring 27 and shoulder 29 of coupling nut 25 is coil spring 28, which serves to urge the internal connector assembly shown in FIGS. 1 and 2 in the direction of connector 23 to eliminate any gap between the optical fibers to be joined. Rubber boot 30 serves to protect the entrance to the connector assembly, and strain relief cap 31 anchors aramid fiber strands from buffer tube 11, in that such strands are placed between threads 16 of the ferrule holder and the strain relief cap. Some of the aramid fibers will fall into grooves 34 in threads 16, thereby further inhibiting internal rotation of the device.

The left side of the connector in FIG. 3 is arranged in the same fashion as the right side of the connector assembly, so that its features need not be repeated in detail.

The glass sleeve is held within the ceramic ferrule by means of epoxy placed between the ferrule and the sleeve. When the end of the connector is abraded, it is found that the optical fiber protrudes slightly from the surface of the glass sleeve, allowing for a better connection with the other optical fiber to be connected. Epoxy is also introduced to mount the buffer tube to the holder, which may be made of a polycarbonate material.

What is claimed is:

1. An optical connector, comprising:

(a) a sleeve having a first end and a second end, the first end composed of a first set of one or more materials, and (b) an optical fiber mounted in the sleeve, the optical fiber composed of a second set of one or more materials, the hardness of all of the second set of materials being greater than the hardness of all of the first set of materials.

2. An optical connector as recited in claim 1, wherein the sleeve opening is flared at the second end.

3. An optical connector as recited in claim 1, further comprising a ceramic ferrule circumscribing the sleeve.

4. An optical connector as recited in claim 1, wherein the first set of one or more materials comprisies borosilicate.

5. An optical connector as recited in claim 1, wherein the first end of the sleeve is recessed slightly from an end of the optical fiber.

6. An optical connector as recited in claim 5, wherein the first set of one or more materials comprises borosilicate.

7. An optical connector as recited in claim 3, wherein the first end is recessed slightly from an end of the optical fiber and the ceramic ferrule is recessed slightly from the first end.

8. A method for making an optical connector having a recessed sleeve, comprising:

(a) providing an optical fiber composed of a second set of one or more materials;

(b) placing a sleeve having a first end and a second end around the optical fiber, the first end composed of a first set of one or more materials, the hardness of all of the second set of materials being greater than the hardness of all of the first set of materials; and, (c) abrading an end of the optical fiber and the first sleeve end.

* * * * *